(12) United States Patent
Goldstein

(10) Patent No.: US 6,934,860 B1
(45) Date of Patent: Aug. 23, 2005

(54) SYSTEM, METHOD AND ARTICLE OF MANUFACTURE FOR KNOWLEDGE-BASED PASSWORD PROTECTION OF COMPUTERS AND OTHER SYSTEMS

(75) Inventor: Richard J. Goldstein, Menlo Park, CA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/566,860

(22) Filed: May 8, 2000

(51) Int. Cl.[7] .................. G06F 11/30; G06F 12/14; H04L 9/00
(52) U.S. Cl. .................. 713/202; 713/183
(58) Field of Search ................ 713/202, 200, 713/183

(56) References Cited

U.S. PATENT DOCUMENTS

| | | | | |
|---|---|---|---|---|
| 5,425,102 A | * | 6/1995 | Moy | 713/183 |
| 5,608,387 A | * | 3/1997 | Davies | 340/5.27 |
| 6,233,682 B1 | * | 5/2001 | Fritsch | 713/168 |
| 6,446,110 B1 | * | 9/2002 | Lection et al. | 709/203 |

* cited by examiner

Primary Examiner—Gilberto Barrón, Jr.
Assistant Examiner—Grigory Gurshman

(57) ABSTRACT

A system, method and article of manufacture are provided for password protecting user access to a computer system. One or more images are displayed to a user. The user is then required to perform a sequence of actions involving the images. The performed sequence of actions is compared with a predefined sequence of actions. If the performed sequence of actions matches the predefined sequence of actions, user access is permitted.

18 Claims, 6 Drawing Sheets

SYSTEM, METHOD AND ARTICLE OF MANUFACTURE FOR KNOWLEDGE-BASED PASSWORD PROTECTION OF COMPUTERS AND OTHER SYSTEMS

FIELD OF THE INVENTION

The present invention relates generally to password protection systems for controlling user access to a computer system and, more particularly, to using human knowledge and visual recognition to prevent unauthorized access to computers and other systems.

BACKGROUND OF THE INVENTION

Computer systems are frequently relied upon to process and store sensitive information. Increasingly, computers are also becoming more and more interconnected with one other via networks such as the Internet. With this increased interconnectivity, the risk of unauthorized access to computers and information has increased.

Password protection schemes are commonly employed to control user access to computer systems by identifying and authenticating authorized users. With a password protection system, proprietary or confidential information retained by the computer system may be protected from unauthorized access. Typical password protection schemes often require a user to input alphanumeric character strings (e.g., a user ID character string and a password character string) in response to a challenge from a security system of a computer. The inputted character strings may then compared with user ID character strings and associated password character strings stored in memory (e.g., in a lookup table). If the inputted user ID and password character strings match one or the user ID character strings and its associated password character string stored in memory, the user is then granted access to data and/or execute programs via the computer system.

Unauthorized access to computer system information can be obtained by exploiting various security flaws found in computer software products. A common flaw is the susceptibility of said software to the theft of identification and authentication data either directly from said software as it executes, or, from the operating system or hardware on which said software is executing. Another common flaw is the susceptibility of said software to illicit modification. Such modifications may remove, disable, or compromise the security features of said software. Also, identification and authentication data can be stolen by monitoring keystrokes on a keyboard, for example, in order to steal a password as it is being typed in. Once stolen, this identification and authentication data may be used to obtain unauthorized access to the protected system.

In order for a password protection scheme to provide effective protection, a user's password needs to be kept secret. However, many common password protection schemes suffer from several problems including:

1. Vulnerability to computational attack by a high speed computer which can simply wander through all combinations of characters until a correct password is found.
2. Once a password has been found, it can subsequently be used over and over again until the breach is discovered.
3. Since users frequently find it difficult to remember passwords, users typically tend to choose simple sequences of character for their passwords which are easy to discover and, therefore, even more vulnerable to attack.

DISCLOSURE OF THE INVENTION

A system, method and article of manufacture are provided for password protecting user access to a computer or other system. One or more images are displayed to a user. The user is then required to perform a sequence of actions involving the images. The performed sequence of actions is compared with a predefined sequence of actions. If the performed sequence of actions matches the predefined sequence of actions, user access is permitted.

In an embodiment of the present invention, the user may further be required to input an identifier associated with the user. In such an embodiment, the predefined sequence of actions may be associated with the identifier of the user so that the predefined sequence associated with the user may be retrieved from a database prior to comparison with the performed series of actions. As another option, the image(s) may also be associated with the identifier of the user so that the image(s) associated with the user identifier may be retrieved from a database in which a plurality of images are stored. As a further option, the positioning of the images with respect to one another when displayed to the user may be dependent on the user identifier inputted by the user.

In an aspect of the present invention, the actions may be performed utilizing a computer input device such as a mouse-type input device. In another aspect of the present invention, the actions may include the input of additional images such as lines or other markings and indicia. In a further aspect of the present invention, the predefined sequence of actions may initially be defined by the user. In even another embodiment of the present invention, a network may be utilized to receive the sequence of actions performed by the user prior to comparing the performed sequence of actions with a predefined sequence of actions. In yet another embodiment of the present invention, the sequence of actions performed by the user may be encrypted.

BRIEF DESCRIPTION OF THE DRAWINGS

The foregoing and other objects, aspects and advantages are better understood from the following detailed description of a preferred embodiment of the invention with reference to the drawings, in which.

DESCRIPTION OF THE PREFERRED EMBODIMENTS

The present description discloses embodiments for a password protection system, methodology, and article of manufacture where human knowledge and visual recognition are used to prevent unauthorized access to computers and other systems. In general, the embodiments of the present invention are based on visual images which a user must "mark-up" in response to a challenge. By using such human knowledge and visual recognition, unauthorized attacks on password protected computers may be prevented. Also, embodiments of the present invention are designed to be difficult to break by systematic computer attacks. Further, aspects of the present invention allow users to have easy-to-remember passwords based on visual images. Because the password requires knowledge of what the particular images are, human knowledge and not computer knowledge is required thereby making it very difficult (if not impossible) for a computer to "deduce" the password.

A preferred embodiment of a system in accordance with the present invention is preferably practiced in the context of a personal computer such as an IBM compatible personal computer, Apple Macintosh computer or UNIX based workstation. A representative hardware environment is depicted in FIG. 1, which illustrates a typical hardware configuration of a computer workstation 100 in accordance with a preferred embodiment having a central processing unit 110, such as a microprocessor, and a number of other units interconnected via a system bus 112.

Figure 1:
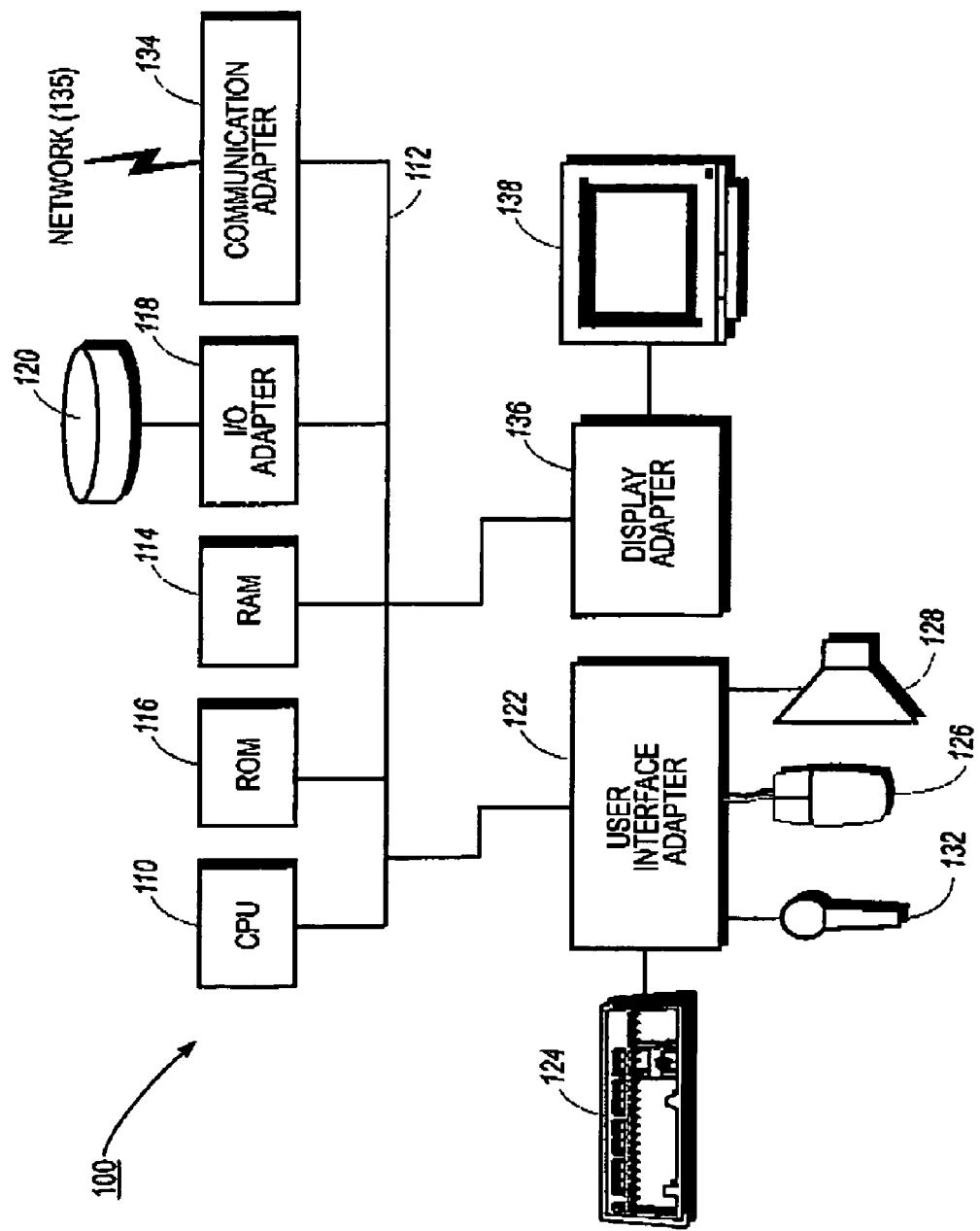
FIG. 1 illustrates a representative hardware environment in accordance with an embodiment of the present invention.

The workstation shown in FIG. 1 includes a Random Access Memory (RAM) 114, Read Only Memory (ROM) 116, an I/O adapter 118 for connecting peripheral devices such as disk storage units 120 to the bus 112, a user interface adapter 122 for connecting a keyboard 124, a mouse 126, a speaker 128, a microphone 132, and/or other user interface devices such as a touch screen (not shown) to the bus 112, communication adapter 134 for connecting the workstation to a communication network 135 (e.g., a data processing network) and a display adapter 136 for connecting the bus 112 to a display device 138.

The workstation typically has resident thereon an operating system such as the Microsoft Windows NT or Windows/95 Operating System (OS), the IBM OS/2 operating system, the MAC OS, or UNIX operating system. Those skilled in the art will appreciate that the present invention may also be implemented on platforms and operating systems other than those mentioned. A preferred embodiment is written using JAVA, C, and the C++ language and utilizes object oriented programming methodology.

OOP is a process of developing computer software using objects, including the steps of analyzing the problem, designing the system, and constructing the program. An object is a software package that contains both data and a collection of related structures and procedures. Since it contains both data and a collection of structures and procedures, it can be visualized as a self-sufficient component that does not require other additional structures, procedures or data to perform its specific task. OOP, therefore, views a computer program as a collection of largely autonomous components, called objects, each of which is responsible for a specific task. This concept of packaging data, structures, and procedures together in one component or module is called encapsulation.

In general, OOP components are reusable software modules which present an interface that conforms to an object model and which are accessed at run-time through a component integration architecture. A component integration architecture is a set of architecture mechanisms which allow software modules in different process spaces to utilize each others capabilities or functions. This is generally done by assuming a common component object model on which to build the architecture. It is worthwhile to differentiate between an object and a class of objects at this point. An object is a single instance of the class of objects, which is often just called a class. A class of objects can be viewed as a blueprint, from which many objects can be formed.

OOP allows the programmer to create an object that is a part of another object. For example, the object representing a piston engine is said to have a composition-relationship with the object representing a piston. In reality, a piston engine comprises a piston, valves and many other components; the fact that a piston is an element of a piston engine can be logically and semantically represented in OOP by two objects.

OOP also allows creation of an object that "depends from" another object. If there are two objects, one representing a piston engine and the other representing a piston engine wherein the piston is made of ceramic, then the relationship between the two objects is not that of composition. A ceramic piston engine does not make up a piston engine. Rather it is merely one kind of piston engine that has one more limitation than the piston engine; its piston is made of ceramic. In this case, the object representing the ceramic piston engine is called a derived object, and it inherits all of the aspects of the object representing the piston engine and adds further limitation or detail to it. The object representing the ceramic piston engine "depends from" the object representing the piston engine. The relationship between these objects is called inheritance.

When the object or class representing the ceramic piston engine inherits all of the aspects of the objects representing the piston engine, it inherits the thermal characteristics of a standard piston defined in the piston engine class. However, the ceramic piston engine object overrides these ceramic specific thermal characteristics, which are typically different from those associated with a metal piston. It skips over the original and uses new functions related to ceramic pistons. Different kinds of piston engines have different characteristics, but may have the same underlying functions associated with it (e.g., how many pistons in the engine, ignition sequences, lubrication, etc.). To access each of these functions in any piston engine object, a programmer would call the same functions with the same names, but each type of piston engine may have different/overriding implementations of functions behind the same name. This ability to hide different implementations of a function behind the same name is called polymorphism and it greatly simplifies communication among objects.

With the concepts of composition-relationship, encapsulation, inheritance and polymorphism, an object can represent just about anything in the real world. In fact, one's logical perception of the reality is the only limit on determining the kinds of things that can become objects in object-oriented software. Some typical categories are as follows:

Objects can represent physical objects, such as automobiles in a traffic-flow simulation, electrical components in a circuit-design program, countries in an economics model, or aircraft in an air-traffic-control system.

Objects can represent elements of the computer-user environment such as windows, menus or graphics objects.

An object can represent an inventory, such as a personnel file or a table of the latitudes and longitudes of cities.

An object can represent user-defined data types such as time, angles, and complex numbers, or points on the plane.

With this enormous capability of an object to represent just about any logically separable matters, OOP allows the software developer to design and implement a computer program that is a model of some aspects of reality, whether that reality is a physical entity, a process, a system, or a composition of matter. Since the object can represent anything, the software developer can create an object which can be used as a component in a larger software project in the future.

If 90% of a new OOP software program consists of proven, existing components made from preexisting reusable objects, then only the remaining 10% of the new software project has to be written and tested from scratch. Since 90% already came from an inventory of extensively tested reusable objects, the potential domain from which an error could originate is 10% of the program. As a result, OOP enables software developers to build objects out of other, previously built objects.

This process closely resembles complex machinery being built out of assemblies and sub-assemblies. OOP technology, therefore, makes software engineering more like hardware engineering in that software is built from existing components, which are available to the developer as objects. All this adds up to an improved quality of the software as well as an increased speed of its development.

Programming languages are beginning to fully support the OOP principles, such as encapsulation, inheritance, polymorphism, and composition-relationship. With the advent of the C++ language, many commercial software developers have embraced OOP. C++ is an OOP language that offers a fast, machine-executable code. Furthermore, C++ is suitable for both commercial-application and systems-programming projects. For now, C++ appears to be the most popular choice among many OOP programmers, but there is a host of other OOP languages, such as Smalltalk, Common Lisp Object System (CLOS), and Eiffel. Additionally, OOP capabilities are being added to more traditional popular computer programming languages such as Pascal.

The benefits of object classes can be summarized, as follows:

Objects and their corresponding classes break down complex programming problems into many smaller, simpler problems.

Encapsulation enforces data abstraction through the organization of data into small, independent objects that can communicate with each other. Encapsulation protects the data in an object from accidental damage, but allows other objects to interact with that data by calling the object's member functions and structures.

Subclassing and inheritance make it possible to extend and modify objects through deriving new kinds of objects from the standard classes available in the system. Thus, new capabilities are created without having to start from scratch.

Polymorphism and multiple inheritance make it possible for different programmers to mix and match characteristics of many different classes and create specialized objects that can still work with related objects in predictable ways.

Class hierarchies and containment hierarchies provide a flexible mechanism for modeling real-world objects and the relationships among them.

Libraries of reusable classes are useful in many situations, but they also have some limitations. For example:

Complexity. In a complex system, the class hierarchies for related classes can become extremely confusing, with many dozens or even hundreds of classes.

Flow of control. A program written with the aid of class libraries is still responsible for the flow of control (i.e., it must control the interactions among all the objects created from a particular library). The programmer has to decide which functions to call at what times for which kinds of objects.

Duplication of effort. Although class libraries allow programmers to use and reuse many small pieces of code, each programmer puts those pieces together in a different way. Two different programmers can use the same set of class libraries to write two programs that do exactly the same thing but whose internal structure (i.e., design) may be quite different, depending on hundreds of small decisions each programmer makes along the way. Inevitably, similar pieces of code end up doing similar things in slightly different ways and do not work as well together as they should.

Class libraries are very flexible. As programs grow more complex, more programmers are forced to reinvent basic solutions to basic problems over and over again. A relatively new extension of the class library concept is to have a framework of class libraries. This framework is more complex and consists of significant collections of collaborating classes that capture both the small scale patterns and major mechanisms that implement the common requirements and design in a specific application domain. They were first developed to free application programmers from the chores involved in displaying menus, windows, dialog boxes, and other standard user interface elements for personal computers.

Frameworks also represent a change in the way programmers think about the interaction between the code they write and code written by others. In the early days of procedural programming, the programmer called libraries provided by the operating system to perform certain tasks, but basically the program executed down the page from start to finish, and the programmer was solely responsible for the flow of control. This was appropriate for printing out paychecks, calculating a mathematical table, or solving other problems with a program that executed in just one way.

The development of graphical user interfaces began to turn this procedural programming arrangement inside out. These interfaces allow the user, rather than program logic, to drive the program and decide when certain actions should be performed. Today, most personal computer software accomplishes this by means of an event loop which monitors the mouse, keyboard, and other sources of external events and calls the appropriate parts of the programmer's code according to actions that the user performs. The programmer no longer determines the order in which events occur. Instead, a program is divided into separate pieces that are called at unpredictable times and in an unpredictable order. By relinquishing control in this way to users, the developer creates a program that is much easier to use. Nevertheless, individual pieces of the program written by the developer still call libraries provided by the operating system to accomplish certain tasks, and the programmer must still determine the flow of control within each piece after it's called by the event loop. Application code still "sits on top of" the system.

Even event loop programs require programmers to write a lot of code that should not need to be written separately for every application. The concept of an application framework carries the event loop concept further. Instead of dealing with all the nuts and bolts of constructing basic menus, windows, and dialog boxes and then making these things all work together, programmers using application frameworks start with working application code and basic user interface elements in place. Subsequently, they build from there by replacing some of the generic capabilities of the framework with the specific capabilities of the intended application.

Application frameworks reduce the total amount of code that a programmer has to write from scratch. However, because the framework is really a generic application that displays windows, supports copy and paste, and so on, the programmer can also relinquish control to a greater degree than event loop programs permit. The framework code takes care of almost all event handling and flow of control, and the programmer's code is called only when the framework needs it (e.g., to create or manipulate a proprietary data structure).

A programmer writing a framework program not only relinquishes control to the user (as is also true for event loop programs), but also relinquishes the detailed flow of control within the program to the framework. This approach allows the creation of more complex systems that work together in interesting ways, as opposed to isolated programs, having custom code, being created over and over again for similar problems.

Thus, as is explained above, a framework basically is a collection of cooperating classes that make up a reusable design solution for a given problem domain. It typically includes objects that provide default behavior (e.g., for menus and windows), and programmers use it by inheriting some of that default behavior and overriding other behavior so that the framework calls application code at the appropriate times.

There are three main differences between frameworks and class libraries:

Behavior versus protocol. Class libraries are essentially collections of behaviors that you can call when you want those individual behaviors in your program. A framework, on the other hand, provides not only behavior but also the protocol or set of rules that govern the ways in which behaviors can be combined, including rules for what a programmer is supposed to provide versus what the framework provides.

Call versus override. With a class library, the code the programmer instantiates objects and calls their member functions. It's possible to instantiate and call objects in the same way with a framework (i.e., to treat the framework as a class library), but to take full advantage of a framework's reusable design, a programmer typically writes code that overrides and is called by the framework. The framework manages the flow of control among its objects. Writing a program involves dividing responsibilities among the various pieces of software that are called by the framework rather than specifying how the different pieces should work together.

Implementation versus design. With class libraries, programmers reuse only implementations, whereas with frameworks, they reuse design. A framework embodies the way a family of related programs or pieces of software work. It represents a generic design solution that can be adapted to a variety of specific problems in a given domain. For example, a single framework can embody the way a user interface works, even though two different user interfaces created with the same framework might solve quite different interface problems.

Thus, through the development of frameworks for solutions to various problems and programming tasks, significant reductions in the design and development effort for software can be achieved. A preferred embodiment of the invention utilizes HyperText Markup Language (HTML) to implement documents on the Internet together with a general-purpose secure communication protocol for a transport medium between the client and the Newco. HTTP or other protocols could be readily substituted for HTML without undue experimentation. Information on these products is available in T. Berners-Lee, D. Connoly, "RFC 1866: Hypertext Markup Language-2.0" (November 1995); and R. Fielding, H, Frystyk, T. Berners-Lee, J. Gettys and J. C. Mogul, "Hypertext Transfer Protocol—HTTP/1.1: HTTP Working Group Internet Draft" (May 2, 1996). HTML is a simple data format used to create hypertext documents that are portable from one platform to another. HTML documents are SGML documents with generic semantics that are appropriate for representing information from a wide range of domains. HTML has been in use by the World-Wide Web global information initiative since 1990. HTML is an application of ISO Standard 8879; 1986 Information Processing Text and Office Systems; Standard Generalized Markup Language (SGML).

To date, Web development tools have been limited in their ability to create dynamic Web applications which span from client to server and interoperate with existing computing resources. Until recently, HTML has been the dominant technology used in development of Web-based solutions. However, HTML has proven to be inadequate in the following areas:

Poor performance;
Restricted user interface capabilities;
Can only produce static Web pages;
Lack of interoperability with existing applications and data; and
Inability to scale.

Sun Microsystems's Java language solves many of the client-side problems by:

Improving performance on the client side;
Enabling the creation of dynamic, real-time Web applications; and
Providing the ability to create a wide variety of user interface components.

With Java, developers can create robust User Interface (UI) components. Custom "widgets" (e.g., real-time stock tickers, animated icons, etc.) can be created, and client-side performance is improved. Unlike HTML, Java supports the notion of client-side validation, offloading appropriate processing onto the client for improved performance. Dynamic, real-time Web pages can be created. Using the above-mentioned custom UI components, dynamic Web pages can also be created.

Sun's Java language has emerged as an industry-recognized language for "programming the Internet." Sun defines Java as: "a simple, object-oriented, distributed, interpreted, robust, secure, architecture-neutral, portable, high-performance, multithreaded, dynamic, buzzword-compliant, general-purpose programming language. Java supports programming for the Internet in the form of platform-independent Java applets." Java applets are small, specialized applications that comply with Sun's Java Application Programming Interface (API) allowing developers to add "interactive content" to Web documents (e.g., simple animations, page adornments, basic games, etc.). Applets execute within a Java-compatible browser (e.g., Netscape Navigator) by copying code from the server to client. From a language standpoint, Java's core feature set is based on C++. Sun's Java literature states that Java is basically, "C++ with extensions from Objective C for more dynamic method resolution."

Another technology that provides similar function to JAVA is provided by Microsoft and ActiveX Technologies, to give developers and Web designers wherewithal to build dynamic content for the Internet and personal computers. ActiveX includes tools for developing animation, 3-D virtual reality, video and other multimedia content. The tools use Internet standards, work on multiple platforms, and are being supported by over 100 companies. The group's building blocks are called ActiveX Controls, small, fast components that enable developers to embed parts of software in hypertext markup language (HTML) pages. ActiveX Controls work with a variety of programming languages including Microsoft Visual C++, Borland Delphi, Microsoft Visual Basic programming system and, in the future, Microsoft's development tool for Java, code named "Jakarta." ActiveX Technologies also includes ActiveX Server Framework, allowing developers to create server applications. One of ordinary skill in the art readily recognizes that ActiveX could be substituted for JAVA without undue experimentation to practice the invention.

Figure 2:
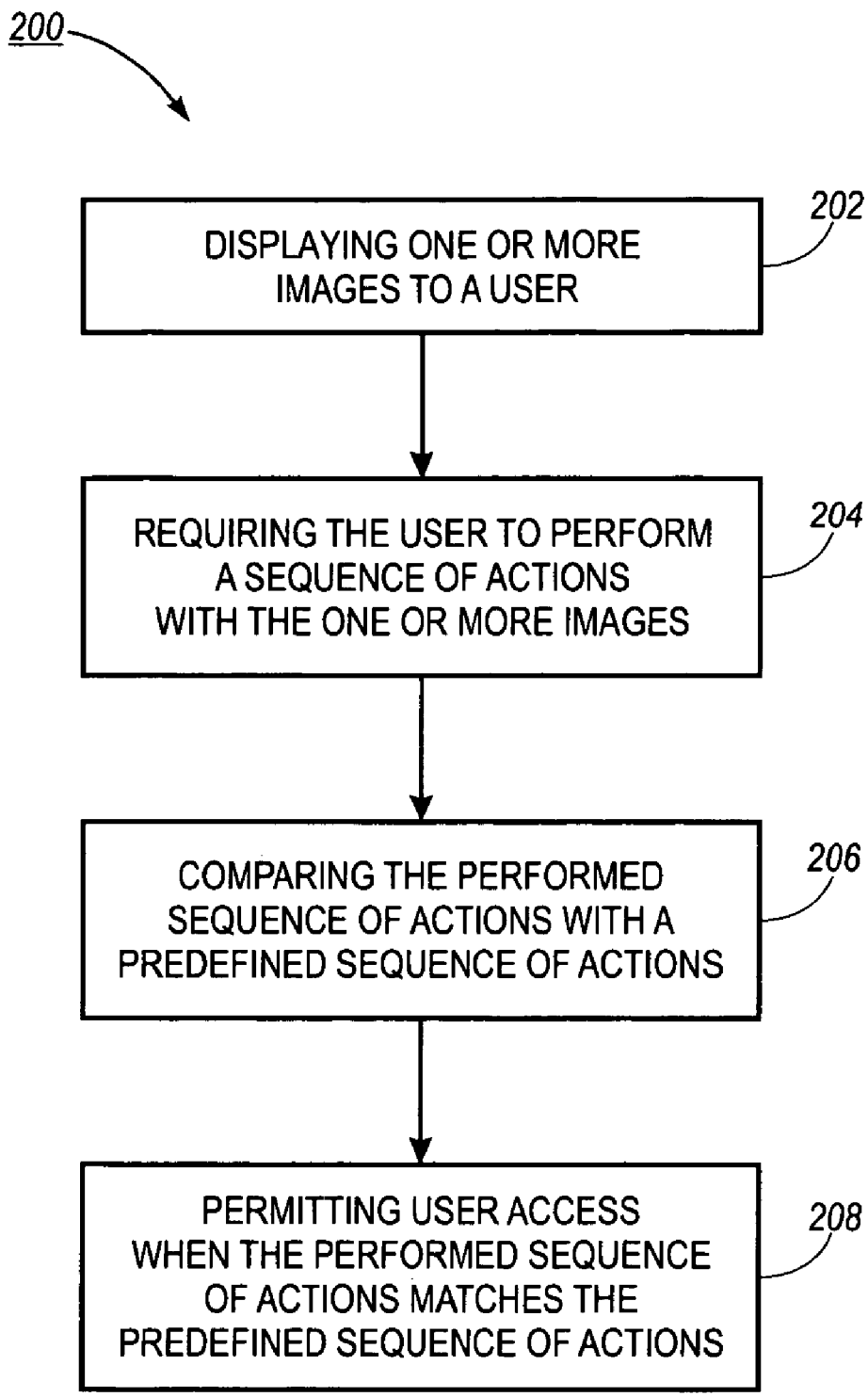
FIG. 2 is a flowchart of a process for password protecting user access to a computer system in accordance with an embodiment of the present invention.

FIG. 2 is a flowchart of a process 200 for password protecting user access to a computer or other system in accordance with an embodiment of the present invention. A computer suitable for embodiments of the present invention may include a processor, memory, and a display. In operation 202, one or more images are displayed to a user on the display of the computer as part of a challenge. The user is then required in operation 204 to perform a sequence of actions involving the images. The performed sequence of actions is compared with a predefined sequence of actions in operation 206. In operation 208, user access to the computer or system is permitted when it is determined that the performed sequence of actions matches the predefined sequence of actions.

Figure 3:
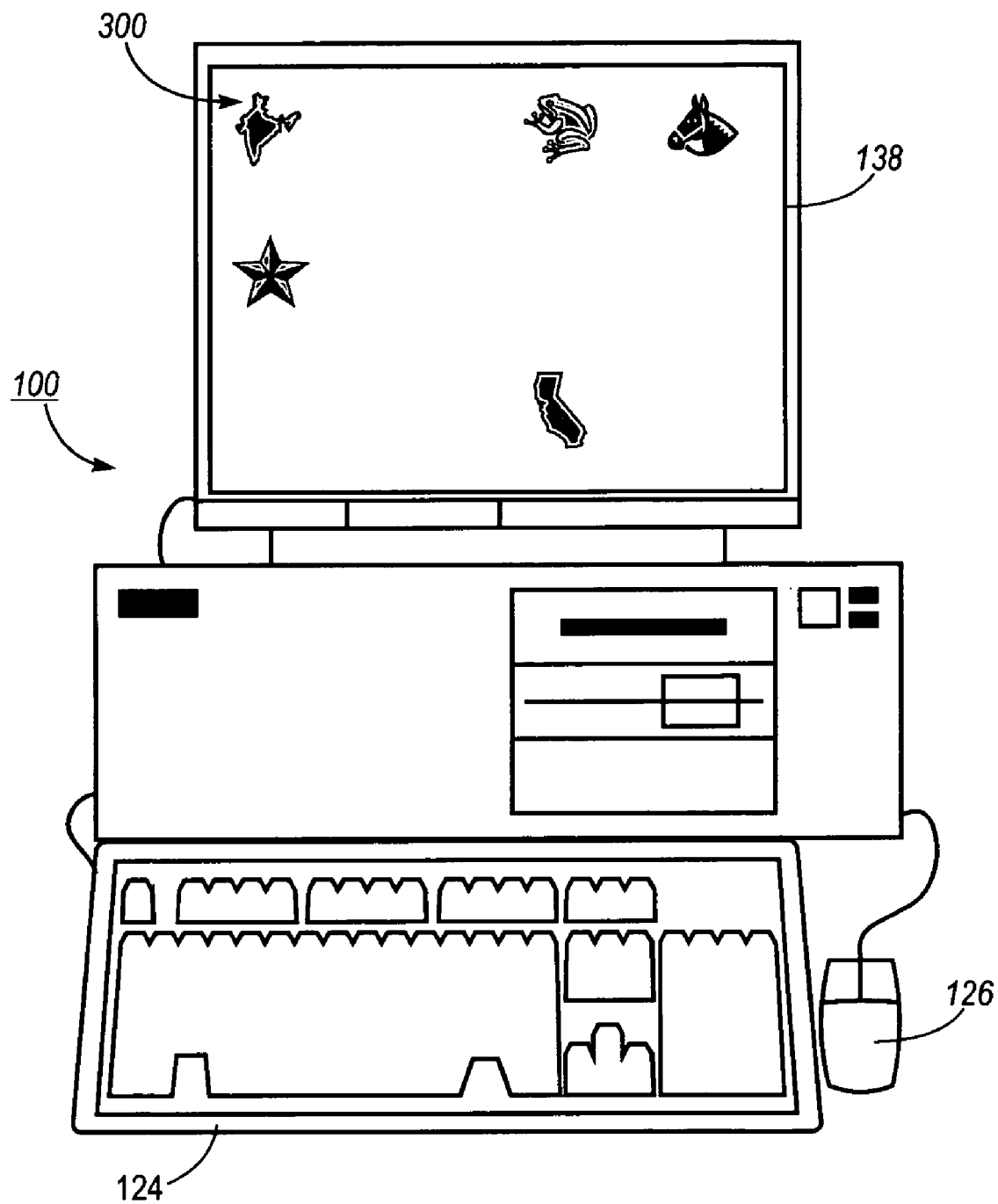
FIG. 3 is a schematic illustration of a computer displaying a challenge of a password protection system in accordance with an embodiment of the present invention.

FIG. 3 is a schematic illustration of a computer displaying a challenge of a password protection system in accordance with an embodiment of the present invention. In particular, the computer 100 includes a keyboard 124, an input device such as a mouse-type input device 126, and a visual display 138. The challenge 300 is displayed on the visual display 138.

Figure 4:
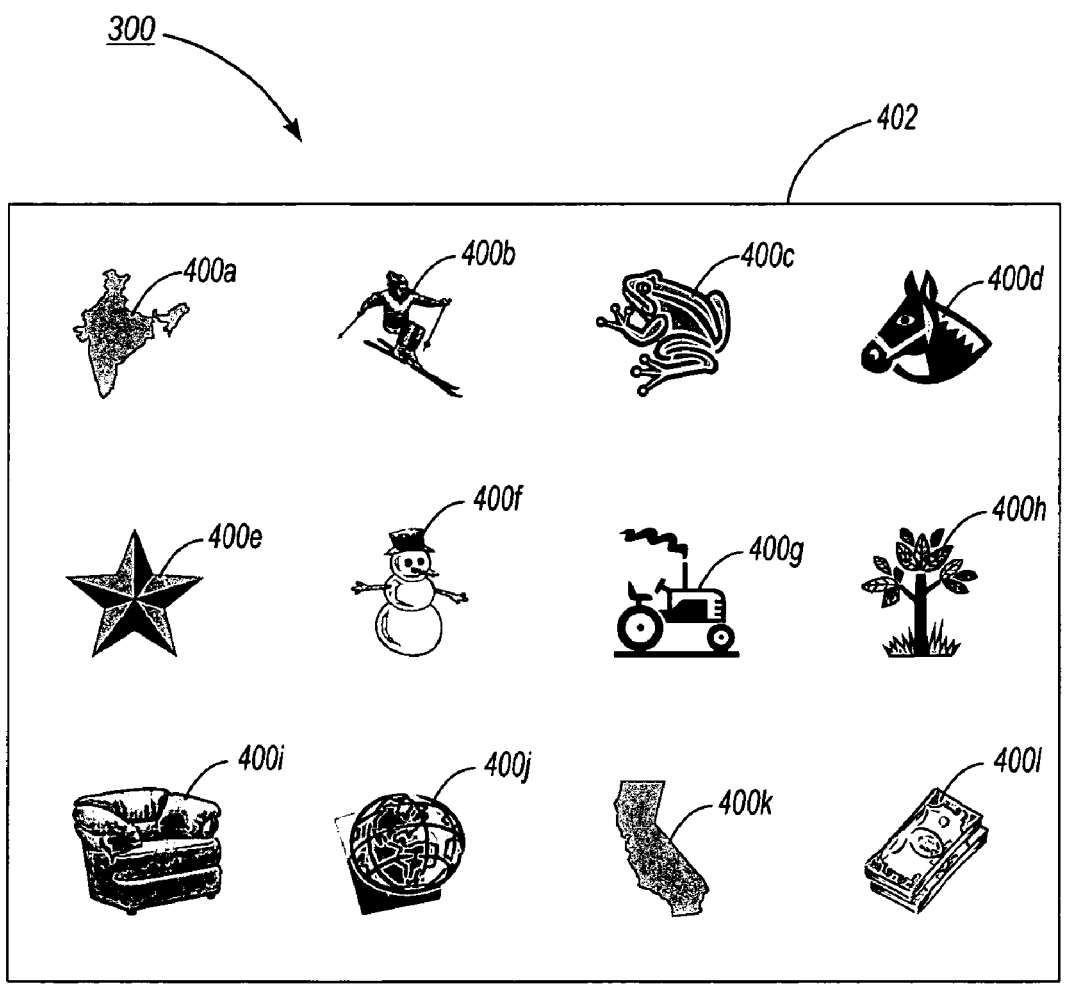
FIG. 4 is a schematic illustration of an exemplary challenge in accordance with an embodiment of the present invention.

FIG. 4 is a schematic illustration of an exemplary challenge 300 in accordance with an embodiment of the present invention. The challenge 300 includes one or more images 400a, 400b, 400c, 400d, 400e, 400f, 400g, 400h, 400i, 400j, 400k, 400l. Any image may be used in the challenge including drawing images, photo images, and even alphanumeric characters and words. In a preferred embodiment of the present invention, the challenge may include between ten and twenty images. As depicted in FIG. 4, some illustrative images that may be displayed include, for example, an outline of India 400a, an image of a skier 400b, an image of a frog 400c, an image of a horse's head 400d, an image of a star 400e, an image of a snowman 400f, an image of a tractor 400g, an image of a plant 400h, and image of a chair 400i, and image of the world 400j, an outline of California 400k, and an image of some money 400l.

In one aspect of the present invention, the images may comprise bit-mapped images. In accordance with one definition, a bit map may define a display space and the color for each pixel or "bit" in the display space. Examples of graphic image file types that contain bit maps include Graphics Interchange Format (GIF) and Joint Photographic Experts Group (JPEG). In one aspect of the present invention, the images may be displayed in a frame 402 on the visual display of the computer or system. In such an embodiment, the entire frame may comprise a bit mapped image.

In an embodiment of the present invention, the user may be required to input an identifier associated with the user prior to the display of the images of the challenge 300. The identifier may be, for example, a user name that is inputted using the keyboard 124 when the user is logging into the computer system. As an option, the images displayed to the user may be uniquely associated with the identifier of the user so that the images associated with the user's identifier are retrieved from a image database that stores a plurality of images therein. For example, if a first user inputs a first identifier associated with the first user, then a first set of images are retrieved from the image database to be included in the challenge 300 displayed to the first user. Similarly, if a second user inputs a second identifier associated with the second user, then a second set of images are retrieved from the image database to be included in the challenge 300 displayed to the second user. The first and second sets of images retrieved from the image database may or may not be identical to each other. As a further option, the positioning of the images of the challenge with respect to one another when displayed to the user may be dependent on the particular inputted user identifier. In one aspect of the present invention, the particular user may be allowed to initially select the images of the set of images and the position of the selected images associated with their particular identifier for individual customizing of the sets of images.

As set forth in operation 204 of FIG. 2, the user is required to perform a sequence of actions involving the images of the challenge 300. This sequence of actions comprises the user's knowledge-based password in the present system. In one aspect of the present invention, the actions may be performed utilizing a computer input device such as, for example, a mouse-type input device 128 coupled to the computer system as illustrated in FIG. 3. The actions performed by the user using the mouse may include the inputting of additional images such as, for example, lines, symbols, marks, and other indicia inside the frame 402 (if included) where the images 400a, 400b, 400c, 400d, 400e, 400f, 400g, 400h, 400i, 400j, 400k, 400l are displayed. As further option, the actions performed by the user may also include "clicking on" one or more of the images 400a, 400b, 400c, 400d, 400e, 400f, 400g, 400h, 400i, 400j, 400k, 400l (or portions thereof) displayed in the frame using the mouse-type input device 128. "Clicking-on" an image using the mouse should be understood to mean the positioning of a pointer displayed on the display device and whose position is controlled by the mouse over an image displayed on the display and then selecting a button of the mouse to send a "Select" indication that provides the user with feedback that a particular position has been selected for further action.

Figure 5:
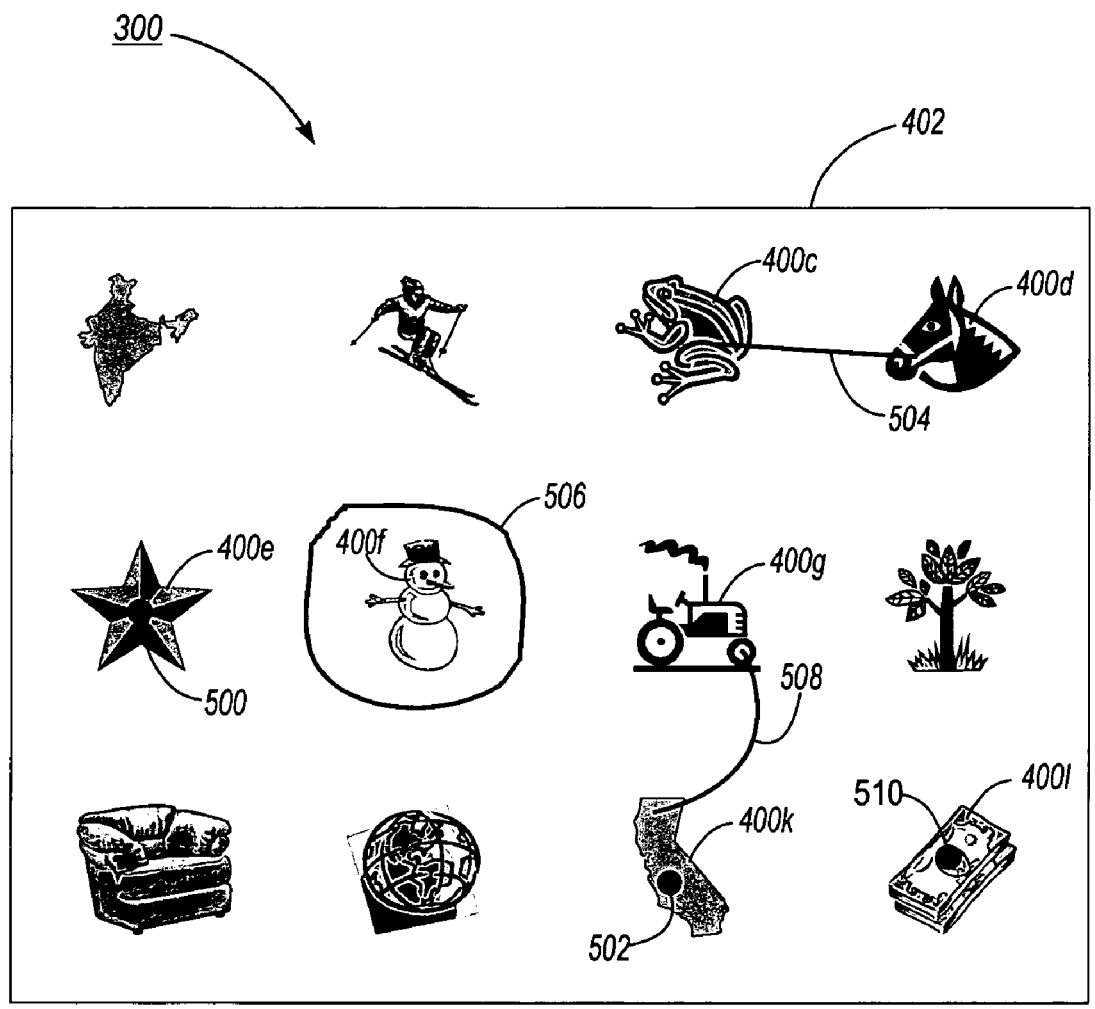
FIG. 5 is a schematic illustration of the exemplary challenge of FIG. 4 with illustrative markings added by the user as a result of the user's performance of an exemplary sequence of actions in accordance with an embodiment of the present invention.

FIG. 5 is a schematic illustration of the exemplary challenge of FIG. 4 with illustrative markings added by the user as a result of the user's performance of an exemplary sequence of actions in accordance with an embodiment of the present invention. For example, in the illustrative example depicted in FIG. 5, the sequence of actions required to be performed by the user may include: first selecting 500 the image of the star 400c (please note that in FIG. 5, selection of or "clicking on" an image is represented by a solid dot on the image being selected); second selecting 502 the outline of California 400k, third drawing a line 504 from the image of the frog 400c to the image of the horse's head 400g (by moving the mouse in corresponding fashion); fourth drawing a line 506 around the image of the snowman 400f; fifth drawing a line 504 from the outline of California 400k to the image of the tractor 400k; and sixth selecting 510 the image of money 400l.

In an embodiment where the user is required to input an identifier associated with the user prior to the display of the images of the challenge 300, the predefined sequence of actions may also be uniquely associated with the identifier of the user so that the predefined sequence associated with the user may be retrieved from an action database prior to comparison with the performed sequence of actions. The action database may be used to store a plurality of predefined sequences of actions for a plurality of different users having access rights to the computer or system.

In another embodiment of the present invention, the knowledge-based password may be a more general sequence of actions that must be performed. As an illustrative example, such a generalized knowledge-based password may comprise the following series of actions:
1. Click on a fruit;
2. Click on the eye of a male figure;
3. Draw a line between the fastest vehicle and an image starting with the letter "B";
4. Draw two random lines anywhere;
5. Draw a line all the way through a household appliance; and
6. Click on the paw of an animal.

In such an illustrative embodiment, a plurality of images would be displayed to the user that will allow to complete the above described generalized sequence of actions. For example, based on the above knowledge-based password, if the displayed images of the challenge included images of an apple, a pirate, a rocket, a balloon, a mountain, a fridge, and a tiger, the use may:
1. Click on the image of the apple;
2. Click on an eye of the image of the pirate;
3. Draw a line between the image of the rocket and the image of the balloon;
4. Draw a pair of lines next to the image of the mountain;
5. Draw a line through the image of the fridge; and
6. Click on a paw of the image of the tiger.

The motion and clicks of the mouse are then transmitted to the challenging computer. The challenging computer would know if the inputted sequence of actions was correct because it had drawn the images from a database of appropriate images. If the response was correct then permission to enter the site would be granted.

In should be noted that the displayed images of the challenge may be the same for each access attempt. As another option, the displayed images of the challenge may be different for each access attempt while still permitting the user to complete the more generalized sequence of actions. For instance, given a challenge with a different set of images including, for example, images of: a pear, a business man, a sports car, a bucket, a sink, and a dog, the user might input the following actions and thereby satisfy the more general required sequence of actions in order to attain authorized access:
1. Click on the image of the pear;
2. Click on an eye of the image of the business man;
3. Draw a line between the image of the sports car and the image of the bucket;
4. Draw a pair of lines anywhere in the frame;
5. Draw a line through the image of the sink; and
6. Click on a paw of the image of the dog.

Thus, with such an aspect where the images of the challenge are different for each access attempt, the user is keying on features (i.e., the sequence of actions) that the user remembers in order to determine how to mark-up the image. This makes it even harder for a hacker to obtain access past the password security system—since even if the hacker gets in by chance once, the same response won't work the next time since the changing of the images of the challenge will require that the next response to be different from the preceding response.

In one aspect of the present invention, the predefined sequence of actions for satisfying the challenge may be initially defined by the user. As a further option, once access has been granted, the user may also be able to modify or change the predefined sequence of actions. This way, the challenge for a particular user may be customized by that user.

In another aspect of the present invention, an esoteric knowledge-based password may be used. An illustrative example of an esoteric knowledge-based password may be: "Click on the image of a person featured on the front page of the N.Y. Times today." In this illustrative example, one of the images of the displayed challenge would be an image of a person featured on the front page of the N.Y. Times on the day the user is attempting to gain access to the password protected system. Another illustrative example of an esoteric knowledge-based password may be: "If there is the picture of a house, then click on an image of an animal that lives under water, otherwise circle something to do with computers."

Figure 6:
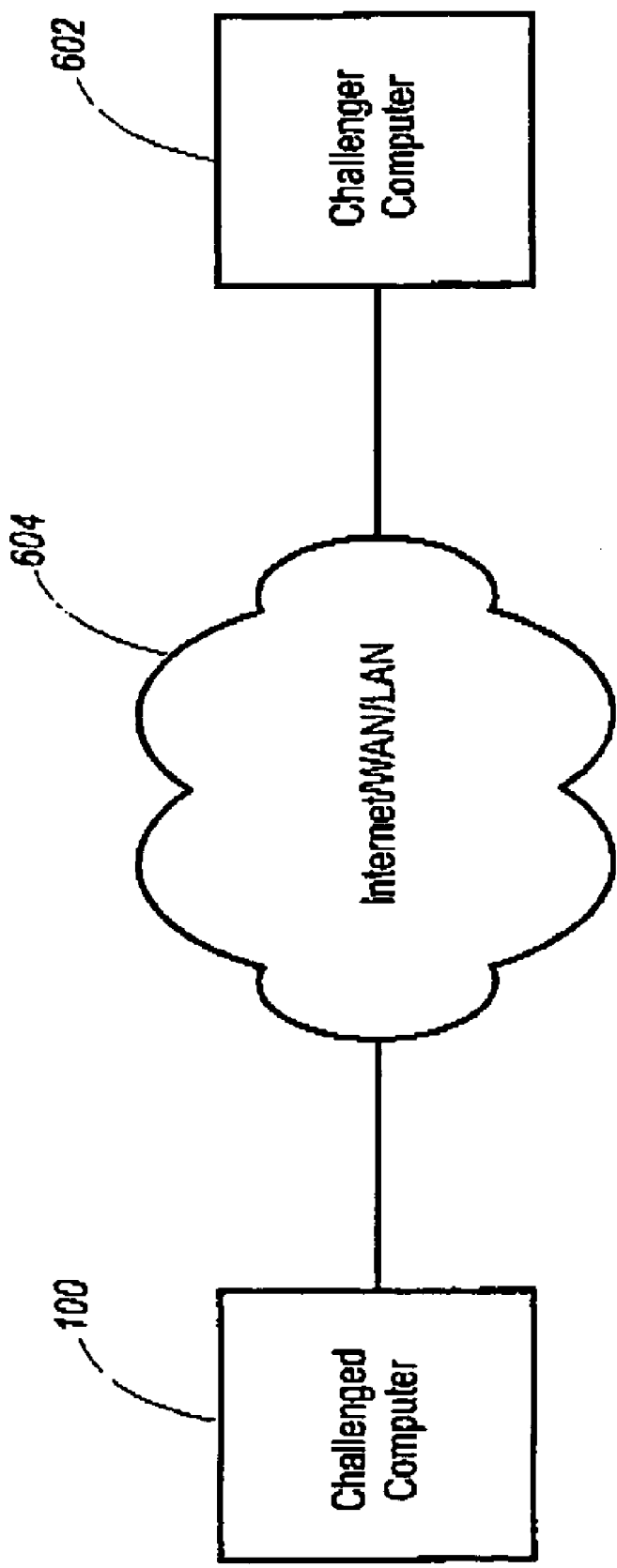
FIG. 6 is a schematic illustration of an embodiment of the present invention that utilizes a network.

FIG. 6 is a schematic illustration of an embodiment of the present invention that utilizes a network. In such an embodiment, a challenged computer 100 may be connected to a challenger computer 602 utilizing a network 604 (such as the Internet, a wide area network ("WAN") or a local area network ("LAN")). In this embodiment, the user uses the challenged computer 100 (i.e., the user's computer) in the user's attempt to obtain access to the challenger computer 602 which is protected by a knowledge-based password protection system. In such an embodiment of the present invention, the network 604 may be utilized to receive (from the challenged computer 100) the sequence of actions performed by the user prior to comparing the performed sequence of actions with a predefined sequence of actions (which may be stored in a database located at the challenger computer 602 rather than at the user's computer 100).

When a network is involved, the network 604 may also be utilized to transmit the images of the challenge prior to their displaying on the display of the user's computer. In such an embodiment, the image database may be located at the challenger computer 602. As another option, the images of the challenge may be stored in the memory of the user's computer. In such an optional embodiment, a reference to the images may be transmitted from the challenger computer 602 to the user's computer 100 so that the referenced images can be retrieved from the memory of the user's computer for display to the user. For example, the images of the challenge may retrieved from a clipart gallery stored in the memory of the challenged computer 100. For further security, the retrieved images may be retrieved from the clipart gallery in a random or unusual order.

For additional security, the images of the challenge may be encrypted prior to transmission from the challenger computer 602 to the challenged computer 100 and then decrypted at the challenged computer prior to display of the images. In a situation where the images are stored on the challenged computer 100 and a reference to the images of the challenge is transmitted to the challenged computer 100 from the challenger computer 602, the reference may be encrypted prior to transmission and then decrypted at the challenged computer 100.

Similarly, for added security, the sequence of actions performed by the user may be encrypted prior to transmitting the performed sequence of action via the network. For example, the mouse movements performed by the user at the challenged computer 100 may be encrypted prior to transmission to the challenger computer 602.

The following portion of the specification discusses additional features that may be included in embodiments for providing even more heightened security. These features address concerns relating to approaches for preventing unauthorized users from accessing and acquiring all the component images in the database (for example, all of the animal images, vehicle images, etc.) so that unauthorized computer recognition of the password may become possible using pattern matching. For example, in an illustrative scenario, an unauthorized user may acquire all of the component images by collecting password images until a full set of the images has been collected. In another aspect of the present invention, the images displayed to the user may be distorted. The images may be by rotating, stretching, squashing, and flipped for example. As another option, additional colors, patterns, or textures may be added to the images to further distort the images. As yet a further option, the images may be distorted by displaying the images in a pointillism format. In an additional aspect of the present invention, the images displayed to the user may be generated by randomly selecting image sub-components and then assembling the image sub-components into an image. The assembly of the image sub-components may be based on various predetermined rules. For example, a fanciful animal image may be generated by assembling image of various animal parts together. As an illustration, an animal image may be generated having the head of a lion, a tail of a peacock, fins of a trout, and legs of a horse.

At this point, it may be beneficial to clarify some terms for aiding this discussion. As previously discussed, an image is a single drawing or photo of something. It might be a drawing of a horse or a photo of a car. Two different drawings of horses are two different images. With this in mind, a composite image is an image composed of multiple images.

Each image may be organized into one or more categories. For example, an image of a horse can be included in a horse category, an animal category, a transportation category, a living creature category, and so on. Each category can be associated with a plurality of attributes. Some illustrative attributes for images of animals may include, for example, attributes for legs, body, chest, rump, head, eyes, ears, mouth, tail, and so on. More abstract attributes may also be created such as attributes relating to direction, height, speed, color, age, etc. It should also be noted that it may be allowed for an image in a category to have more than one attribute (of the particular category in which it is associated). However, not every image in a category needs to have every attribute associated with that particular category.

Each attribute may include one or more parameters which specify the value of the attribute. In cases of things such as the eye attributes of an animal image, the parameters can specify the X,Y coordinates of the eyes in the image. In abstract cases such as height, the parameters can specify the height in terms of inches (or some other measurement unit).

With this set of terms, it is possible to further describe a further embodiment where each knowledge-based password can be composed of an ordered sequence of actions. In such an embodiment, each action in the sequence may be composed of an act and one or more category/attributes. Some illustrative examples of actions include (where X and Y are categories or attributes): circle X; draw a line from X to Y; draw a square around X; draw an arrow from X to Y; make a cross on X; tap three times on X.

Actions can also utilize various modifiers. For instance, actions can take conjunctions such as "circle X or circle Y". Actions may also be allowed to utilize if/then clauses such as, for example: "if you circle X then don't circle Y".

Another type of modifier to actions is a "random" modifier. Some illustrative examples of random modifiers include: "make a random mark on X," or "mark a random X." As a further option, abstract place holders may also be utilized as a modifier. Some examples of abstract place holders include: "make a random mark anywhere" or "make a triangle out of any three attributes." With abstract modifiers, even more abstract actions are allowed, such as for example, "draw a line between an X and a Y of the same color; or circle an X bigger than the largest animal Y. The complexity of knowledge-based password may only depend on a person's ability to remember a particular sequence of actions.

Returning to our illustrative scenario, in one embodiment of the present invention, a queried computer can take the name of a user and then look up the user's knowledge-based password in the password database. Using the images in the image database, the queried computer can construct a randomized composite image that has at least one set of correct categories and attributes so that the user can complete the predefined sequence of actions of his/her knowledge-based password. The retrieved composite image is transmitted to the user, who then is allowed to mark up the composite image with a sequence of actions which can be transmitted back to the queried computer for verification to determine if the sequence of actions matches the knowledge-based password associated with that particular user.

As mentioned previously, under this illustrative scenario, a potential concern may be that an unauthorized user may be able gain access to the entire database of images. With access to the database of images, the unauthorized user may then have the ability to deduce the entire range of categories and attributes associated with the images. A computer can then be used to decode the composite image through straight forward pattern matching (which is much easier if the base images are known). If the unauthorized user is then able to utilized their computer to access large number of queries and responses from a given person, the unauthorized user's computer may then possibly induct the given person's knowledge-based password.

While it may be difficult to assess this potential threat in the abstract, the following measures may be taken to substantially reduce any such threat from an unauthorized user.

Single Database Model (with or without Updates)

In a single database model, when a company purchases a knowledge-based password system from the vendor, the purchasing company does not get the image database.

Instead the database of images resides only in a single place, in a secure system at the vendors. This image database can then be continually updated with new images.

In such a model, the following measures may be conducted to help prevent access by unauthorized users:
1. A user sends their user name to the company's computer system;
2. The company sees if it is a valid user name;
3. If it is a valid user name the company sends the user name to the vendor;
4. The vendor looks up the user name in its secure database and retrieves a list of all the categories/attributes required to satisfy the knowledge-based password of the user;
5. The vendor then randomly assembles a composite image from its image database that would satisfy the user's knowledge-based password;
6. This composite image is transmitted (in encrypted form) back to the company utilizing a network;
7. The company sends this image to the user utilizing the network;
8. The user then "mouse draws" on the image to satisfy her knowledge-based password;
9. Only the "mouse drawings" (i.e., sequence of actions) are then sent back to the company (in encrypted form) utilizing the network;
10. The company then sends these mouse drawings back to the vendor utilizing the network;
11. The vendor checks to see if the mouse drawings are valid; and
12. The vendor then notifies the company whether the inquirer is valid or not.

In this model, unauthorized users would never have access to the full database of images. Furthermore, as noted, the vendor would be constantly updating the image database.

Distortion of Composite Image

Another approach that may be utilized as a measure to prevent unauthorized users from breaching a knowledge-based password system is by utilizing an approach where the composite image is distorted. Computer deduction of images is extremely difficult. The pattern matching of images is much easier. For example, if one has the image of a horse, one can sift through large numbers of other composite images looking for matching images. Under this distortion approach, simple distortions of the images makes such pattern matching more time consuming. For example, the image can be rotated, stretched, squashed, flipped etc. Sifting can be made even more difficult when the images are processed or enhanced using various tools that can add in camouflage, patterns, textures, strokes, etc. Additionally, parts of an image can be removed and still be easily recognized by a user while at the same time making it much harder for a computer to recognize. As another option under the distortion model, the images can be embedded into very complex scenes. For example, the images can be composited using complex processes (as found in Photoshop) into photographs of street scenes, jungles, fractals, ocean scenes and so on. The human eye can detect these images fairly easily, while for the computer it becomes far more time consuming. As a further approach, the images can even be reduced to sets of dots which a user can perceive but a computer cannot.

A combination and compounding of these techniques under this distortion approach can produce an image of extreme complexity that would be enormously difficult for a computer to decode or "crack" even if the computer had access to the component images for pattern matching.

Construction of Images

A construction of images approach uses a rule system that randomly generates images in categories that are easy to recognize by users (i.e., humans), but which are hard for a computer to recognize. By generating such kinds of images, there are no base images to do pattern matching on. The computer would have to do a kind of abstract feature matching, which may prove to be more difficult if not impossible than compared to simple pattern matching.

As an illustrative example, utilizing this approach, a vendor's computer may be programmed to randomly compose images of four legged animals in a near-infinite variety. Most of these would not look like real animals at all, but human users should be able to recognize their animal-ness and act accordingly upon such fanciful images.

Encryption of Queries

There are several places in a knowledge-based password system where extra layers of encryption can be added. Under one aspect of the present invention, the composite image sent to the user can be encrypted and only decrypted at the inquirer's machine.

It should also be noted that the composite image does not have to be sent back to the company or the vendor since they already have the image. All that needs to be sent back are the "mouse drawings" or sequence of actions performed by the user (e.g., the lines, shapes, clicks, etc. made by the user's mouse). This sequence of actions may simply be a set of vector lines. In such a situation, the sequence of actions may be deeply encrypted using PGP or the like. As another option, the vector lines can also be encrypted in another fashion: they can be distorted, reversed, bent, swapped, twisted and so on, so that the lines no longer match the composite image at all. At the vendor's computer they can be undistorted or "un-bent" prior to comparison with the correct sequence of actions stored in the database. In such an optional aspect of the present invention, each user may have a unique code assigned thereto for bending the mouse drawings.

Additional Embodiments in the Context of Security

Computers are becoming widely interconnected and heavily relied upon to process and store sensitive information. The risk of unauthorized access to computers and information has increased with this increased interconnectivity.

Many security advances exist in the areas of identification & authentication of users, cryptography, virus prevention, and the like, however—almost all of these advances ultimately rely upon computer software. Most computer systems are, or are accessed by, small personal computers, and most software used on these personal computers is susceptible to "local attacks"—attacks which are mounted from inside said personal computers against said software by other software or people.

Passwords, User-ID's, credit-card numbers and expiry dates, bank account and PIN numbers, smart-card data, biometric information (for example: the data comprising a retina or fingerprint scan), cryptographic keys, and the like, are all examples of identification, authentication or similar data which is either sensitive in itself, or may allow access to sensitive, restricted or other information or services. Hereafter, the term ID-Date will be used to refer to the abovementioned identification, authentication or similar data, excluding ID-Data which is valid only for a single use, or which is designed to expire at regular intervals of short periods of time, say less than two minutes.

Illegal access to computer system information can be obtained by exploiting various security flaws found in computer software products. A common flaw is the susceptibility of said software to the theft of ID-Data either directly from said software as it executes, or, from the operating system or hardware on which said software is executing. Another common flaw is the susceptibility of said software to (illegal) modification. Such modifications may remove, disable, or compromise the security features of said software.

Viruses, Terminate-and stay-resident programs (TSRs), co-resident software, multi-threaded operating system processes, Trojan Horses, Worms, Hackers, Spoof programs, keypress password capturers, macro-recorders, sniffers, and the like can be effective at stealing ID-Data and are examples of (a) rogue software, (b) people capable of subverting security software, or, (c) software which can be configured for illegitimate purposes. Hereafter, the term rogue software will be used to refer to software or subversions such as the above mentioned (a) (b) and (c), used for the purpose of stealing ID-Data. The definition of our term "rogue software" when used herein also includes software or other means used to tamper with other software. The term tampering is defined hereafter.

There are many ways to introduce rogue software into a computer system. Viruses spread automatically by introducing themselves. Trojan-Horses are usually introduced by tricking users into allowing them to execute (such as by masquerading as a new or well-known computer game or other product). Existing security problems may be utilized to introduce rogue software, some well known problems include lava bugs, errors, or oversights, ineffective physical security (for example: permitting rogue software to be introduced directly on floppy disk by an intruder); electronic mail attachments which automatically execute or execute after a simple mouse-click, incorrect security settings on internet, world-wide-web, TCP/IP or modems, and tampering (see definition hereafter) with legitimate software in-transit as it flows from remote internet sites into a users computer, to name a few.

Rogue software, once introduced, can steal ID-Data as mentioned hereinbefore. It may monitor keyboard (for example: by recording every key, as the user presses each one, in order to steal a password as it is being typed in), serial-port, mouse, screen, or other devices to steal ID-Data directly from them. It may monitor other software, applications, the operating system, or disks to steal ID-Data from there also. Once stolen, this ID-Data may be stored locally (for example: in memory or on-disk) or transmitted to remote locations (for example: by modem or network) or used immediately to perform illegal operations. Hereafter, the term eavesdropping will be used to refer to the monitoring of a computer to record ID-Data.

The process of the present invention thus provides protection against certain attacks on executable software by persons or other software used on the computer. Software using this process is protected against eavesdropping (the monitoring of software, applications, the operating system, disks, keyboard, or other devices to record (steal) identification, authentication or sensitive data such as passwords, User-ID's, credit-card numbers and expiry dates, bank account and PIN numbers, smart-card data, biometric information (for example: the data comprising a retina or fingerprint scan), or encryption keys), local and remote tampering (altering software to remove, disable, or compromise security features of the altered software) examination (viewing the executable program, usually with the intent of devising security attacks upon it), tracing (observing the operating of an executable program step-by-step), and spoofing (substituting counterfeit software to emulate the interface of authentic software in order to subvert security) by rogues (e.g.: Trojan Horses, Hackers, Viruses, Terminate-and-stay-resident programs, co-resident software, multi-threaded operating system processes, Worms, Spoof programs, keypress password capturers, macro recorders, sniffers, and other software or subversions).

While various embodiments have been described above, it should be understood that they have been presented by way of example only, and not limitation. Thus, the breadth and scope of a preferred embodiment should not be limited by any of the above described exemplary embodiments, but should be defined only in accordance with the following claims and their equivalents.

What is claimed is:

1. A method for password protecting user access, comprising:
   (a) displaying a composite image to a user, the composite image including a plurality of images relevant to a knowledge-based password known to the user;
   (b) requiring the user to perform a sequence of actions to one or more of the plurality of images included in the composite image to produce a marked-up composite image; an action in the sequence of actions including drawing in the composite image at least one of a graphical shape connecting two of the images, and a graphical shape around an image;
   (c) comparing the performed sequence of actions indicated by the marked-up composite image with a predefined sequence of actions consistent with the knowledge-based password; and
   (d) permitting user access when the performed sequence of actions matches the predefined sequence of actions.

2. A method as recited in claim 1, further comprising requiring the user to input an identifier associated with the user.

3. A method as recited in claim 2, wherein the predefined sequence of actions is associated with the identifier of the user, and further comprising retrieving the predefined sequence associated with the user from a database.

4. A method as recited in claim 2, wherein the plurality of images included in the composite image are associated with the identifier of the user, and further comprising retrieving the plurality of images associated with the identifier from a database.

5. A method as recited in claim 2, wherein positioning each of the plurality of images with respect to one another displayed to the user in the composite image is dependent on the user identifier inputted by the user.

6. A method as recited in claim 1, wherein the actions are performed utilizing a computer input device.

7. A method as recited in claim 1, further comprising utilizing a network to receive the sequence of actions performed by the user prior to comparing the performed sequence of actions with a predefined sequence of actions.

8. A method as recited in claim 1, further comprising encrypting the sequence of actions performed by the user.

9. A method as recited in claim 1, wherein the predefined sequence of actions are defined by the user.

10. A computer program embodied on a computer readable medium for password protecting user access to a computer, comprising:

(a) a code segment that displays a composite image to a user, the the composite image including a plurality of images relevant to a knowledge-based password known to the user;

(b) a code segment that requires the user to perform a sequence of actions to one or more images included in the composite image to produce a marked-up composite image; an action in the sequence of actions including drawing in the composite image at least one of a graphical shape connecting two of the images and a graphical shape around an image.

(c) a code segment that compares the performed sequence of actions indicated by the marked-up composite image with a predefined sequence of actions consistent with the knowledge based password; and (d) a code segment that permits user access to a computer when the performed sequence of actions matches the predefined sequence of actions.

11. A computer program as recited in claim 10, further comprising a code segment that requires the user to input an identifier associated with the user.

12. A computer program as recited in claim 11, wherein the predefined sequence of actions is associated with the identifier of the user, and further comprising a code segment that retrieves the predefined sequence associated with the user from a database.

13. A computer program as recited in claim 11, wherein the plurality of images included in the composite image are associated with the identifier of the user, and further comprising a code segment that retrieves the plurality of images associated with the identifier from a database.

14. A computer program as recited in claim 11, wherein each of the plurality of images with respect to one another displayed to the user in the composite image is dependent on the user identifier inputted by the user.

15. A computer program as recited in claim 10, further comprising a code segment that utilizes a network to receive the sequence of actions performed by the user prior to comparing the performed sequence of actions with a predefined sequence of actions.

16. A computer program as recited in claim 10, further comprising a code segment that encrypts the sequence of actions performed by the user.

17. A computer program as recited in claim 10, wherein the predefined sequence of actions are defined by the user.

18. A system for password protecting user access to a computer, comprising:

(a) logic that displays a composite image to a user, the composite image including a plurality of images relevant to a knowledge-based password known to the user;

(b) logic that requires the user to perform a sequence of actions to one or more images included in the composite image to produce a marked-up composite image; an action in the sequence of actions including drawing in the composite image at least one of a graphical shape connecting two of the images and a graphical shape around an image;

(c) logic that compares the performed sequence of actions indicated by the marked-up composite image with a predefined sequence of actions consistent with the knowledge-based password; and (d) logic that permits user access to a computer when the performed sequence of actions matches the predefined sequence of actions.

* * * * *